United States Patent [19]
Quenot

[11] 3,874,608
[45] Apr. 1, 1975

[54] TAPE MEASURE CASING

[75] Inventor: Michel Quenot, Besancon, France

[73] Assignee: Stanley-Mabo, Besancon, France

[22] Filed: Nov. 19, 1973

[21] Appl. No.: 417,469

[30] Foreign Application Priority Data
Nov. 27, 1972 France.............................. 72.42086

[52] U.S. Cl.................................. 242/84.8, 33/138
[51] Int. Cl............................................ B65h 75/16
[58] Field of Search...................... 242/84.8; 33/138;
206/52 R

[56] References Cited
UNITED STATES PATENTS
3,381,916   5/1968   Edgell.................................... 33/138
3,436,032   4/1969   Quenot.............................. 242/84.8
3,443,316   5/1969   Edgell.................................... 33/138
3,450,367   6/1969   Edgell.................................... 33/138

Primary Examiner—Edward J. McCarthy
Attorney, Agent, or Firm—Prutzman, Hayes, Kalb & Chilton

[57] ABSTRACT

A tape measure casing comprises a main shell having a central hub with a cylindrical bore opening into an enlarged cylindrical recess in a side wall, and a rotatable side flange including an integral tape drum disposed coaxially about a central cylindrical pivot rotatably received in said bore of the hub. The shell and flange are held together by a clipping button having an enlarged cruciform head rotatably received in said enlarged recess, a square shank keyed in a square bore in the pivot, and elastically deformable hooking projections engaging in a hooking recess in the pivot.

8 Claims, 7 Drawing Figures

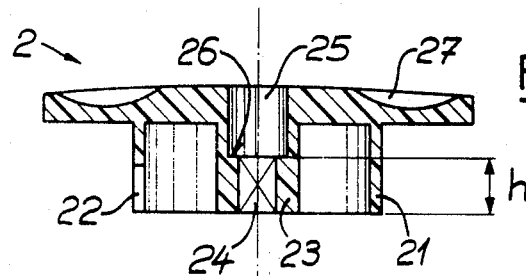
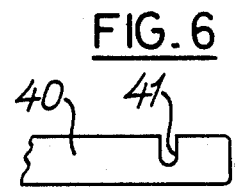
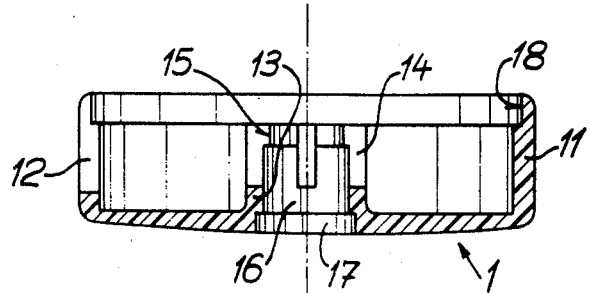
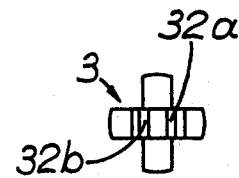
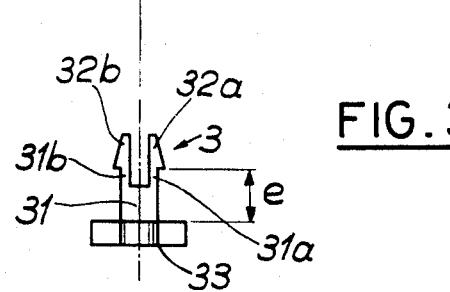
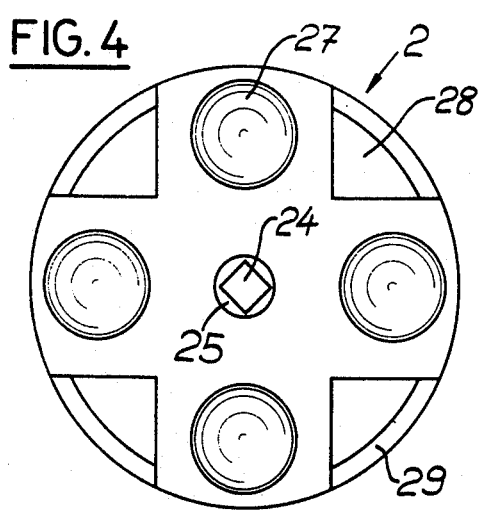
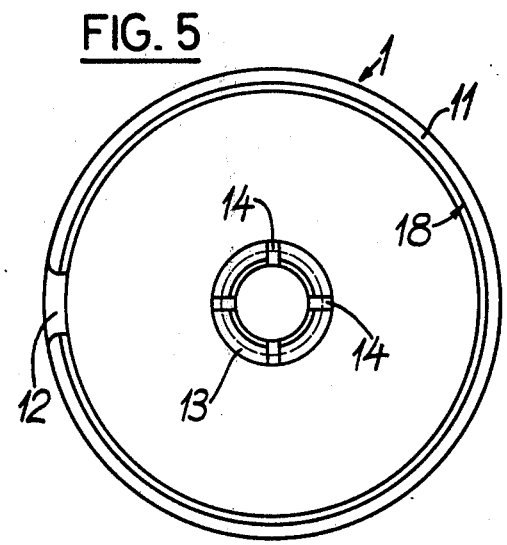

TAPE MEASURE CASING

The invention relates to casings for tape measures or tape rules.

A known type of casing generally employed with 5 or 10 metre tapes consists of a shell with a side flange rotatably mounted about a central shaft, the rotatable flange forming a cover for the shell and carrying, on its inner face, a tape winding drum.

Most casings constructed according to this principle are satisfactory from the points of view of having a reliable and precise winding and unwinding action, and are robust, but nevertheless involve a fairly complicated construction and assembly.

An object of the invention is to provide a simplified construction of such a tape measure casing, which is fairly robust and has an adequate winding and unwinding action.

According to the invention, a tape measure casing comprises a shell formed by first and second members defining first and second lateral walls of the casing, one of the first and second members being integral with a tape drum and being rotatably mounted relative to the other of the first and second members. The first member has a central hub integral therewith and means defining a cylindrical first central through bore in said hub opening into an enlarged recess in said first lateral wall. The second member has a central cylindrical pivot integral therewith, said pivot being rotatably received in said first bore of said hub and having an end thereof disposed in the vicinity of said enlarged recess of the first lateral wall. Means are provided for defining a non-cylindrical second central bore in said end of the pivot and further means define at least one hooking recess in the second bore. A clipping button holds the first and second members together, said button including a head rotatably received in said enlarged recess in said one wall, a non-cylindrical shank keyed in said second bore, and at least one elastically deformable projection engaged in said at least one hooking recess in said second bore.

This casing can be provided with a reduced number of parts, namely three parts, for example of molded plastic materials, and can be simply and rapidly assembled. The tooling-up costs, notably for injection molds, can consequently be reduced.

The above-indicated and further features of the invention will be apparent from the following description, made by way of example, of a preferred embodiment, with reference to the accompanying drawings, in which:

FIG. 1 is an axial cross-section through the main part or shell of the casing;

FIG. 2 is an axial cross-section through a tape-drum carrying flange;

FIG. 3 is a side elevational view of a clipping button;

FIG. 4 is a top plan view of the flange shown in FIG. 2;

FIG. 5 is a plan view of the shell, looking from above FIG. 1;

FIG. 6 is a detail of an end of a measuring tape adapted to be used with the casing;

FIG. 7 is a top plan view of the button shown in FIG. 3.

The casing according to the invention comprises a main shell 1, FIG. 1, a tape-drum carrying flange 2, FIG. 2, and a clipping button 3, FIG. 3, adapted to hold shell 1 and flange 2 assembled together for rotation relative to one another.

The shell 1, FIGS. 1 and 5, consists of a circular side wall integral with a cylindrical peripheral wall 11 including a tape outlet slot 12, and with a central hub 13 having a cylindrical through bore 16 opening into an enlarged cylindrical recess 17 in the outer face of the side wall. The inner end of hub 13 has cruciform slots 14 defining four elastically deformable tongues, each having at their inner (i.e. upper in FIG. 1) ends an inwardly directed projection 15. Peripheral wall 11 has, at its edge, an annular groove 18 adapted to freely rotatably receive the edge of flange 2.

The flange 2, FIGS. 2 and 4, has integral therewith on its inner (i.e. lower looking at FIG. 2) face a tape winding drum 21 with a slot 22 for engaging with a transverse slot 41 towards the end of and extending across about a half of the width of a measuring tape 40 (FIG. 6). Drum 21 is disposed coaxially about a cylindrical central pivot 23, also integral with flange 2, with an outer diameter slightly less than the diameter of bore 16, whereby pivot 23 is received with a slight play in bore 16, with its end extending up to the shoulder defining recess 17, and is elastically gripped by projections 15 which provide a braking effect to prevent relative rotation of flange 2 and casing 1 under the effect of any spring action of the wound tape. A central bore 24 of square cross section is provided in the inner end of pivot 23 over a length $h$, bore 25 being extended to the outer lateral wall of flange 2 by a cylindrical bore 25, the diameter of which is slightly greater than the diagonal of square bore 24, thereby forming a hooking recess including a shoulder 26 joining the square and cylindrical bores 24 and 25.

Button 3 includes a cruciform head 33 extended by a shank 31 of square cross-section slightly smaller than bore 24, this shank extending to a split square end, the split extending along part of the length of shank 31 and defining two elastically deformable tongues 31a, 31b each provided with an outwardly directed hooking projection or catch 32a, 32b respectively. The hooking ends of catches 32a, 32b are separated from the arms of head 33 by a distance $e$ equal to the length $h$ of bore 24.

Thus, when the flange 2 carrying a tape 40 wound on drum 21 is fitted in shell 1, the casing is assembled simply by pressing button 3 in bore 24, which involves an inward deformation of arms 31a, 31b, until catches 32a, 32b pass over shoulder 26 and expand outwardly. The outer ends of the arms of head 33 rotatably engage in recess 17 to prevent axial separation of flange 2 and casing 1, while allowing relative rotation of these parts with the button 3 keyed in bore 24.

To facilitate rotation of flange 2 by one hand while shell 1 is held in another hand, to wind in or out the tape, the outer face of flange 2 is provided with a plurality of eccentric finger-receiving recesses 27 which avoid the need for a separate winding crank. As shown, these recesses 27 can be provided in cruciform arms extending radially to an annular edge or rim 29 of the flange, these arms and rim 29 bounding four symmetrical openings 28. Of course the said arms, instead of being cruciform, could have other generally symmetrical dispositions.

What is claimed is:

1. A tape measure casing comprising a shell formed by first and second members defining first and second lateral walls of the casing, one of the first and second members being integral with a tape drum and being rotatably mounted relative to the other of the first and second members, the first member having a central hub integral therewith and means defining a cylindrical first central through bore in said hub, said bore opening into an enlarged recess in said first lateral wall, the second member having a central cylindrical pivot integral therewith, said pivot being rotatably received in said first bore of said hub and having an end thereof disposed in the vicinity of said enlarged recess of the first lateral wall, means defining a non-cylindrical second central bore in said end of the pivot, means defining at least one hooking recess in said second bore, and a clipping button for holding said first and second members together, said button including a head rotatably received in said enlarged recess in said one wall, a non-cylindrical shank keyed in said second bore, and at least one elastically deformable projection engaged in said at least one hooking recess in said second bore.

2. A tape measure casing according to claim 1, in which said first member forms a main shell of the casing including a peripheral edge wall integral with said first lateral wall and means defining a tape withdrawal aperture in said peripheral edge wall, said second member being in the form of a flange integral with the tape drum.

3. A tape measure casing according to claim 1, in which said second bore is of square cross-section, said clipping button having a shank of square cross-section slightly smaller than that of said second bore, said shank extending to an end and being split from said end over part of its length to form two elastically deformable tongues each having an outwardly directed hooking projection.

4. A tape measure casing according to claim 3, in which said square second bore is extended towards said second lateral wall by a cylindrical bore of greater diameter than the edge of the square bore, said hooking recess including a shoulder joining the square and cylindrical bores.

5. A tape measure casing according to claim 1, in which said hub has a free end including a plurality of elastically deformable tonques elastically gripping and braking said pivot.

6. A tape measure casing according to calim 2, comprising means defining a plurality of eccentric finger-receiving recesses in the external surface of said flange.

7. A tape measure casing according to claim 6, comprising means defining a plurality of openings in said flange bounded by an annular outer edge of the flange and by a plurality of arms extending generally radially to said annular edge, said finger-receiving recesses being disposed in said arms.

8. A tape measure casing according to claim 1, in which said tape drum includes means defining a slot engaging with a transversally slotted end of a measuring tape.

* * * * *